United States Patent
Li et al.

(10) Patent No.: US 11,261,356 B2
(45) Date of Patent: Mar. 1, 2022

(54) ACRYLIC/EPOXY HYBRID MATERIALS FOR LAMINATING ADHESIVE APPLICATIONS

(71) Applicants: Dow Global Technologies LLC, Midland, MI (US); Rohm and Haas Company, Collegeville, PA (US)

(72) Inventors: Wenwen Li, Pearland, TX (US); Rui Xie, Pearland, TX (US); Zhenwen Fu, Norristown, PA (US)

(73) Assignees: Dow Global Technologies LLC, Midland, MI (US); Rohm and Haas, Collegeville, PA (US)

( * ) Notice: Subject to any disclaimer, the term of this patent is extended or adjusted under 35 U.S.C. 154(b) by 661 days.

(21) Appl. No.: 16/063,959

(22) PCT Filed: Sep. 30, 2016

(86) PCT No.: PCT/US2016/054789
§ 371 (c)(1),
(2) Date: Jun. 19, 2018

(87) PCT Pub. No.: WO2017/112018
PCT Pub. Date: Jun. 29, 2017

(65) Prior Publication Data
US 2020/0270491 A1    Aug. 27, 2020

Related U.S. Application Data

(60) Provisional application No. 62/270,608, filed on Dec. 22, 2015.

(51) Int. Cl.
| | | |
|---|---|---|
| *C09J 133/08* | (2006.01) | |
| *C08L 33/08* | (2006.01) | |
| *C08L 63/00* | (2006.01) | |
| *C09J 163/00* | (2006.01) | |

(52) U.S. Cl.
CPC ............. *C09J 133/08* (2013.01); *C08L 33/08* (2013.01); *C08L 63/00* (2013.01); *C09J 163/00* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 5,037,700 A | 8/1991 | Davis | |
| 5,480,720 A | 1/1996 | Eisenhart et al. | |
| 8,658,742 B2 | 2/2014 | Dombrowski et al. | |
| 2012/0301621 A1* | 11/2012 | Dombrowski | C08F 220/18 427/386 |

FOREIGN PATENT DOCUMENTS

| | | |
|---|---|---|
| CN | 103205224 | 7/2013 |
| DE | 102005012813 | 9/2006 |

OTHER PUBLICATIONS

PCT/US2016/054789, International Search Report and Written Opinion dated Dec. 12, 2016.
PCT/US2016/054789, International Preliminary Report on Patentability dated Jun. 26, 2018.

* cited by examiner

*Primary Examiner* — Jeffrey D Washville

(57) ABSTRACT

A laminating adhesive composition comprising a) an aqueous dispersion of thermoplastic polymer particles imbibed with an epoxy compound wherein the concentration of the epoxy compound is from 1 weight percent to 40 weight percent, based on the total weight of the solid content of the aqueous dispersion; and b) at least one water emulsifiable or water dispersible epoxy curing agent selected from polyamines, polyamides, amidoamines, carboxylic functional polyesters, anhydrides, mercaptans, polymer captans, cyclic amidines, and combinations thereof, is disclosed.

4 Claims, No Drawings

ACRYLIC/EPOXY HYBRID MATERIALS FOR LAMINATING ADHESIVE APPLICATIONS

REFERENCE TO RELATED APPLICATIONS

The present application claims the benefit of U.S. Provisional Application No. 62/270,608, filed on Dec. 22, 2015.

BACKGROUND OF THE INVENTION

Laminating adhesives are widely used in manufacturing flexible laminates (with two or more layers) for food packaging applications. Based on the adhesive compositions, laminating adhesives can be classified into three categories: solventborne (SB), solventless (SL) and waterborne (WB). Waterborne dry laminating adhesives (WBDL) are known to be safer—no VOC issues or solvent retention, and easier to clean. One current technology for WBDL adhesive applications is a 2K system based on acrylic/polyurethane. It consists of acrylic latex modified by a small amount of a low molecular weight polyol, which is combined with a water-emulsifiable isocyanate prior to the application. These laminating adhesives perform relatively well for general and medium performance applications. However, for medium-high performance applications that are more demanding, these WBDL adhesives often fail due to poor temperature, moisture, and chemical resistance. In addition, these adhesives do not exhibit adequate adhesion to certain substrates, such as foil or metalized films. Therefore, a WBDL adhesive with better performance properties is desired.

SUMMARY OF THE INVENTION

In one broad aspect of the present invention, there is disclosed a laminating adhesive composition comprising, consisting of, or consisting essentially of a) an aqueous dispersion of thermoplastic polymer particles imbibed with an epoxy compound wherein the concentration of the epoxy compound is from 1 weight percent to 40 weight percent, based on the total weight of the solid content of the aqueous dispersion; and b) at least one water emulsifiable or water dispersible epoxy curing agent selected from polyamines, polyamides, amidoamines, carboxylic functional polyesters, anhydrides, mercaptans, polymercaptans, cyclic amidines, and combinations thereof.

In another aspect of the present invention, there is disclosed a method for forming a cured laminate comprising, consisting of, or consisting essentially of the steps of: a) applying the curable composition of Claim 1 to a first substrate, b) drying the curable composition; c) laminating a second substrate to the coated first substrate to form a laminate; and d) curing the laminate to form the cured laminate.

DETAILED DESCRIPTION OF THE INVENTION

Examples of suitable epoxy compounds include, but are not limited to aliphatic epoxy resins, cyclo-aliphatic epoxy resins, and aromatic epoxy resins. More specific examples include, but are not limited to 1,2-propanediol diglycidyl ether, 1,4-butanediol diglycidyl ether, 1,6-hexanediol diglycidyl ether, poly(propylene glycol) diglycidyl ether, 1,4-cyclohexanedmethanol diglycidyl ether, 1,3-cyclohexanedmethanol diglycidyl ether, 3',4'-epoxycyclohexymethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, vinyl cyclohexene monoxide, bis(3,4-epoxycyclohexylmethyl) adipate, the diglycidyl ester of phthalic acid, the diglycidyl ester of hexahydrophthalic acid, diglycidyl ether of bisphenol A (DGEBA), solid epoxy resins based on DGEBA, phenoxy resins, the diglycidyl ether of bisphenol F, an epoxy novolac resin, and cresol epoxy novolacs.

The amount of epoxy resin encapsulated in the acrylate particle is generally in the range of from 1 weight percent to 40 weight percent, is in the range of from 1 weight percent to 15 weight percent in various other embodiments, and from 1 weight percent to 10 weight percent in various other embodiments, based on the total weight of solids in the acrylate dispersion.

An acrylate dispersion can be prepared through free radical emulsion or suspension addition polymerization or by dispersion of a pre-formed polymer under shear into an aqueous medium. Monomers suitable for the preparation of the acrylic latex particles include, but are not limited to acrylates and methacrylates, such as methyl acrylate, ethyl acrylate, butyl acrylate, glycidyl methacrylate, 2-ethylhexyl acrylate, methyl methacrylate, ethyl methacrylate, butyl methacrylate, and 2-ethylhexyl methacrylate, and combinations thereof.

Monomers with acid functionality may also be included, such as acrylic acid, methacrylic acid, itaconic acid, phosphoethyl methacrylate, sodium styrene sulfonate, and acrylamido-methyl-propane sulfonate. Generally, the concentration of acid monomers is less than or equal to 20 weight percent based on the weight of the polymer. The acid monomer concentration can be up to 15 weight percent in some embodiments, and up to 5 weight percent in various other embodiments.

In various embodiments, the acrylic latexes may also include structural units of other monomers such as styrene and acrylonitrile, as well as monomers capable of imparting co-curable functionality such as glycidyl acrylates and glycidyl methacrylates.

In various embodiments, an epoxy emulsion is prepared by mixing an epoxy resin with water. In various embodiments, the mixing occurs at a temperature in the range of from 10° C. to 90° C., preferably from 20° C. to 60° C. and a high-speed mixer or a homogenizer is used. In various embodiments, surfactants can be used in the preparation of the epoxy emulsion. Suitable surfactants include, but are not limited to nonionic surfactants, including APEO free, nonionic wetting agents such as polyalkylene oxide block copolymers, polyoxyethylene glycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON™ X-405 Octylphenol Ethoxylate available from The Dow Chemical Company. If a surfactant is used, it is generally used at a concentration in the range of from 0.5 weight percent to 5 weight percent.

The epoxy emulsion comprises epoxy particles having a size in the range of from 50 nanometers to 10 microns. Any and all ranges from 50 nm to 50 microns are included herein and disclosed herein, for example, the epoxy particles can have a size in the range of from 50 nm to 15 microns, or from 50 nm to 10 microns.

The epoxy emulsion is then mixed with the acrylate dispersion to form an acrylic/epoxy latex having acrylic particles fully imbibed with epoxy. This mixing typically occurs at a temperature in the range of from 20° C. to 80° C., preferably from 40° C. to 60° C.

The imbibed acrylic/epoxy latex compositions are cured with a hardener. Examples of suitable hardeners include but are not limited to aliphatic amines, aromatic amines, amine adducts, polyamides, amidoamines, carboxylic functional polyesters, anhydrides, mercaptans, polymercaptans, cyclic amidines, polyether amines, and combinations of any two or more thereof. More specific examples include, but are not limited to diethylenetriamine, triethylenetetramine, tetraethylenepentamine, 2,2,4-trimethylhexamethylenediamine, 2,4,4-trimethylhexamethylenediamine, 1,6-hexanediamine, 1-ethyl-1,3-propanediamine, bis(3-aminopropyl) piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norboranediamine, 4,4'-diaminodicyclohexylmethane, 4,4'-diaminodicyclohexylmethane, 4,4'-diaminodicyclohexyl-propane, 2,2-bis(4-aminocyclohexyl) propane, 3,3'-dimethyl-4,4'-diaminodicyclohexylmethane, 3-amino-1-cyclohexane-amino-propane, 1,3- and 1,4-bis (aminomethyl)cyclohexane, m-xylylenediamine, p-xylylenediamine, polyoxypropylenediamines, polyamidoamines, and aminoplast resins formed by the reaction of ureas and melamines with aldehydes.

The imbibed acrylic/epoxy latex composition can be cured over a wide temperature range for an effective time. In various embodiments, the curing occurs after the curable composition (imbibed acrylic/epoxy latex mixed with a hardener) is applied to a substrate. The substrate is generally selected from the group consisting of a polymer film, a metalized polymer film, a foil, a polymer-backed metal foil, paper, and combinations thereof.

In various embodiments, acrylic/epoxy latex is mixed with hardener/curing agents, and coated on a first substrate to yield a dry coating weight of 1.5-2.2 lb/ream. A second substrate can then be laminated to the first substrate and the resulting laminates can be cured at room temperature or elevated temperature, such as 40-50° C. The substrate is generally selected from the group consisting of a polymer film, a metalized polymer film, a foil, a polymer-backed metal foil, paper, and combinations thereof.

Examples

Materials
Robond™ L-90M: acrylic emulsion with solid content ~42%, available from Dow Chemical Company.
Robond™ L-330: acrylic emulsion with solid content ~45%, available from Dow Chemical Company.
Robond™ L-230: acrylic emulsion with solid content ~45%, available from Dow Chemical Company.
DER 331: Bisphenol A based liquid epoxy resin, epoxy equivalent weight (EEW) 182-192, available from Olin.
DER 731: aliphatic liquid epoxy resin, EEW: 130-145, available from Olin.
CR9-101: isocyanate based water dispersible cross-linker, available from The Dow Chemical Company.
Anquamine 401: a modified aliphatic amine curing agent, supplied at 70% solids in water, AHEW 200, available from Air Products. It is diluted with DI water at a 1/1 ratio by weight before use.
Triton X-405: octylphenol ethoxylate, nonionic surfactant, 70% in water, available from Dow Chemical Company.
PET (92LBT): Polyester, Poly(ethylene glycol-terephthalate), thickness 23 micron (92 Gauge), available from DuPont
OPP: Coex PP (75SLP): Bicor SLP Oriented Polypropylene, Non-Heat Sealable, thickness 19 micrometers (0.75 mils), available from Exxon Mobil.
PE: GF-19, high slip low density polyethylene film, thickness 25.4 micrometers (1.0 mil), available from Berry Plastics Corp.,
PET-Foil: 12 micrometer (48 Gauge) Polyester (PET) Film laminated to 0.00035 mil Al Foil with Adcote 550/Coreactant F at 3.26 g/m$^2$ (2.00 lbs/ream), available from Dow Chemical Company.

Acrylic Epoxy Hybrid (AEH) Dispersion Examples

Acrylic epoxy hybrid dispersion examples were prepared in two steps. In the first step, epoxy emulsion was prepared under high shear; in the second step, the epoxy emulsion was mixed with acrylic latexes at elevated temperature to allow the epoxy resins to slowly diffuse into the latex particles under overhead agitation. Detailed formulations are summarized in Table 1.

In a typical example of preparing an acrylic epoxy hybrid (AEH) example based on Robond™ L-90M and DER 331, for example, acrylic epoxy hybrid example 1, AEH-1, 30 g of Triton X-405 and 67 g of DI water were mixed in a metal can for several minutes until a homogenous surfactant solution was formed, then 129.5 g of preheated DER 331 (preheated at 60° C. oven to reduce resin viscosity) was added to the surfactant solution under overhead agitation, the mixture was stirred until no epoxy droplets adhere to the wall of container. The epoxy/surfactant/water mixture was then mixed under high shear conditions with an overhead high speed mixer at 3000 rpm for 20 min Finally, 45.3 g of the formed epoxy emulsion was added to a flask which contained 65 g of preheated Robond™ L-90M (60° C.). The epoxy/Robond™ L-90M mixture was stirred at 60° C. for 1-2 hours. Samples were taken periodically from the flask to check the latex particle size by DLS. Stirring was stopped when no large epoxy droplets were observed in DLS analysis. Samples were discharged into glass jar and stored at room temperature.

Acrylic Epoxy Hybrid Dispersions Containing Less than 30% Epoxy by Weight were Prepared in Two Ways:

Method 1: Direct encapsulation. In a typical example of preparing Robond™ L-330 with 5% (based on solid) DER 731 encapsulated (AEH-9), 30 g of Triton X-405 and 67 g of DI water were first mixed in a metal can for several minutes until a homogenous surfactant solution was formed. Then, 129.5 g of DER 731 was added to surfactant solution under overhead agitation, the mixture was stirred until no epoxy droplets adhered to the wall of container. The epoxy/surfactant/water mixture was then mixed under high shear conditions with an overhead high speed mixer at 2000 rpm for 20 min Finally, 24.2 g of the foamed epoxy emulsion was added to a flask which contained 600 g of Robond™ L-330 preheated at 60° C. The epoxy/Robond™ L-330 mixture was stirred at 60° C. for 4 hours. Samples were taken periodically from the flask to check the latex particle size by DLS. Stirring was stopped when no large epoxy droplets can be observed in DLS analysis. Samples were discharged into glass jar and stored at room temperature.

Method 2: Blending of acrylic latexes containing 30% epoxy with more acrylic emulsions. In a typical example of preparing Robond™ L-90M with 5% (based on solid) DER 331 encapsulated (AEH-5), 118 g of Robond™ L-90M latexes, were mixed with 20 g of AEH-1 (Robond™ L-90M containing 30% DER331) on a roller for 2 hours. Typical formulations are summarized in Table 2.

TABLE 1

Acrylic Epoxy Hybrid (AEH) Dispersion Examples (direct encapsulation)

|  | AEH-1 | AEH-2 | AEH-3 | AEH-4 | AEH-9 | AEH-10 | AEH-11 |
|---|---|---|---|---|---|---|---|
| Triton X-405 | 3 | 3 | 6 | 6 | 3 | 3 | 2.8 |
| DI water | 6.7 | 6.7 | 13.4 | 13.4 | 6.7 | 6.7 | 6.54 |
| DER 331 | 12.95 | 0 | 25.9 | 0 | 0 | 0 | 0 |
| DER 731 | 0 | 14.5 | 0 | 29 | 14.5 | 14.5 | 13.54 |
| Robond ™ L-90M | 65 | 66.6 | 0 | 0 | 0 | 0 | 0 |
| Robond ™ L-330 | 0 | 0 | 120 | 136 | 600 | 0 | 0 |
| Robond ™ L-230 | 0 | 0 | 0 | 0 | 0 | 600 | 340 |
| total | 87.65 | 90.8 | 165.3 | 184.4 | 624.2 | 624.2 | 362.88 |

TABLE 2

Acrylic Epoxy Hybrid Dispersion Examples (blending)

|  | AEH-5 | AEH-6 | AEH-7 | AEH-8 |
|---|---|---|---|---|
| AEH-1 | 20 | 0 | 0 | 0 |
| AEH-2 | 0 | 20 | 0 | 0 |
| AEH-3 | 0 | 0 | 20 | 0 |
| AEH-4 | 0 | 0 | 0 | 20 |
| Robond ™ L-90M | 118 | 130 | 0 | 0 |
| Robond ™ L-330 | 0 | 0 | 110 | 112 |
| total | 138 | 150 | 130 | 132 |

Examples and Comparative Examples of Laminating Adhesives

Acrylic latexes containing epoxy resins were mixed with amine hardener before lamination, the stoichiometry of epoxide/NH groups was set at 1/0.8-1/1, specific formulations are shown in Table 3. The plastic films were corona treated at a lower level ca. 0.12-0.14 KW before lamination. Typically, each sample was hand coated onto the primary film with coating weight adjusted to be ca. 1.6-1.8 lb/rm, then dried for 1 min in the oven with temperature set at 80° C. The primary film was laminated to the secondary film on an oil based laminator with nip temperature set at 180° F. At least five laminates (about 9 inch×11 inch) were prepared for each formulation with bond strip within some laminates to facilitate bond strength testing. The laminates were placed under 1-2 lbs weight in the order to apply equivalent pressure across the laminate sample, and the laminates were allowed to cure at room temperature for 2 weeks or at 50° C. for 1 day.

Bond Strength Measurement of Laminate Structures

T-peel bond strength was measured on a 1 inch strip at a rate of 10 inch/min on an Instron tensile tester with a 50 N loading cell. Five strips were tested for each laminate and high and mean strength were recorded together with the failure mode. In case of film tear and film stretch, the high value was reported and in other failure modes the average T-peel bond strength was reported. Typical failure modes include:

AF—Adhesive failure (adhesive with primary);
AT—Adhesive transfer (adhesive with secondary);
AS—Adhesive split (cohesive failure of adhesive);
FT—Film tear (destruct bond)
FS—Film stretch (destruct bond)

Boil in Bag Test of Laminates

One of the cured laminate (9 inch×11 inch) was folded over to give a double layer. The edges were trimmed on a paper cutter to a fold piece about 5 inch×7 inch. The edges were then heat sealed to give a pouch with an interior size of 4 inch×6 inch. Two pouches were made for each test. Pouches were then filled 100 mL of either DI water or 1/1/1 sauce (blend of equal parts by weight of catsup, vinegar and vegetable oil) through the open edge. After filling, the pouch was sealed in a manner that minimized the air entrapment inside of the pouch. The filled pouches were then carefully placed in boiling water and kept there for 30 minutes, and make sure the bags were always immersed in water during the whole process. When completed, the extent of tunneling, delamination or leakage was compared with marked pre-existing flaws. The bags were then emptied and at least two 1 inch strips were cut from the pouches and T-peel bond strength was measured as soon as possible.

TABLE 3

Examples and Comparative examples of Laminating Adhesives

|  |  | Comparative Example 1 | Comparative Example 2 | Example 1 | Example 2 | Example 3 | Example 4 | Example 5 | Example 6 | Example 7 |
|---|---|---|---|---|---|---|---|---|---|---|
| Side A | Robond L-90M | 100 | 0 | 0 | 0 | 0 | 0 | 0 | 0 | 0 |
|  | Robond L-330 | 0 | 100 | 0 | 0 | 0 | 0 | 0 | 0 | 0 |
|  | AEH-5 | 0 | 0 | 100 | 0 | 0 | 0 | 0 | 0 | 0 |
|  | AEH-6 | 0 | 0 | 0 | 100 | 0 | 0 | 0 | 0 | 0 |
|  | AEH-7 | 0 | 0 | 0 | 0 | 100 | 0 | 0 | 0 | 0 |
|  | AEH-8 | 0 | 0 | 0 | 0 | 0 | 100 | 0 | 0 | 0 |
|  | AEH-9 | 0 | 0 | 0 | 0 | 0 | 0 | 100 | 0 | 0 |
|  | AEH-10 | 0 | 0 | 0 | 0 | 0 | 0 | 0 | 100 | 0 |
|  | AEH-11 | 0 | 0 | 0 | 0 | 0 | 0 | 0 | 0 | 100 |
| Side B | CR 9-101 | 0 | 2 | 0 | 0 | 0 | 0 | 0 | 0 | 0 |
|  | Anquamine 401 | 0 | 0 | 3.62 | 5.04 | 4.08 | 5.68 | 5.68 | 6.88 | 12.62 |

Comparative Example 1, Example 1 and Example 2

Comparative Example 1, Example 1, and Example 2 were evaluated in PET/PE laminates. Anquamine 401 was used as a curing agent for Example 1 and Example 2. The stoichiometry of epoxide/NH groups was set at 1/0.8. As shown in Table 4, compared to Comparative Example 1, when Example 1 and Example 2 were used for lamination, no drop of initial bond was observed. In fact, slightly higher initial bond was achieved in the case of Example 2. The bond strength increased as epoxy resins cured over time. For instance, when Example 2 was used for the lamination, bond strength increased from 250 g/inch to over 320 g/inch after 1 day curing, and much higher bond strength, over 800 g/inch, was achieved after 1 week curing at room temperature. Film tear was observed when the laminates were allowed to cure at room temperature for 2 weeks. In contrast, the bond strength of laminates based on Comparative Example 1 was only ~320 g/inch even after 2 weeks. Continuous buildup of bond strength was also observed for Example 1, with film tear after 2-week curing.

The improvement in bond strength of Example 2 over Example 1 is not expected. Both examples contained the same polymer particles. However, Example 2 was imbibed with an aliphatic epoxy, while Example 1 was imbibed with a bisphenol A epoxy. In conventional epoxy applications, such as coatings, bisphenol A epoxy resins usually demonstrate better mechanical strength, chemical resistance, and heat resistance.

TABLE 4

Bond strength of laminating adhesives based on Comparative Example 1, Example 1 and 2

| Laminate adhesive | Laminate structure | Initial bond strength (g/inch) | 1 day bond strength (g/inch) | 7 days bond strength (g/inch) | 14 days bond strength (g/inch) |
|---|---|---|---|---|---|
| Comparative Example 1 | PET-PE | 170, AF | 157, AF | 251, AF | 320, AF |
| Example 1 | PET-PE | 180, AF | 253, AS | 447, AS | 927, FT |
| Example 2 | PET-PE | 249, AF | 324, AS | 852, AS | 1087, FT |

Comparative Example 2, Example 3, 4, and 5

Laminating adhesive Comparative Example 2, Example 3, 4, and 5 were evaluated in PET/PE laminates. Anquamine 401 was used as a curing agent for Example 3, 4, and 5. The stoichiometry of epoxide/NH groups was set at 1/0.8. As shown in Table 5, when Example 4 were used for the lamination, bond strength increased from 170 g/inch to over 400 g/inch after 1 day curing, and film tear was achieved after 1 week curing at room temperature. In case of using Example 3 for lamination, increase of bond strength was observed as epoxy cured. When Example 5 was used as laminate adhesive, initial bond strength was measured at 380 g/inch (AS), and film tear was observed after 1-week curing at room temperature.

Comparing to Comparative Example 2, Example 5 showed comparable/better bond strength than that of comparative Example 2 after fully cured. Film tear was observed in both cases.

Example 4 and Example 5 demonstrated improved bond strength and faster bond over Example 3. Example 4 and Example 5 were imbibed with an aliphatic epoxy resin, while Example 3 was imbibed with a bisphenol A epoxy resin. The improved bond strength and faster bond of the aliphatic epoxy-imbibed adhesive over the bisphenol A-imbibed adhesive are not expected.

Due to the concern of the use of bisphenol A in food contact applications, Example 4 and 5 are preferred.

Comparative Example 2, Example 4 and 5 were also evaluated with other laminating structures, including OPP/PE and PET-Foil/PE. Typical bond strength results are summarized in Table 6. Good bond strength was observed on all structures above when Examples 4 and 5 were used as adhesives. Example 4 and Example 5 demonstrated improved bond strength over Comparative Example 2 on all structures, PET/PE, OPP/PE, and PET-Foil/PE after cured at 50° C. for one day.

TABLE 5

Bond strength of laminating adhesives based on
Comparative Example 2, Example 3, 4 and 5 for PET/PE Structure

| Laminate adhesive | Laminate structure | Initial bond strength (g/inch) | 1 day bond strength (g/inch) | 7 days bond strength (g/inch) | 14 days bond strength (g/inch) |
|---|---|---|---|---|---|
| Comparative Example 2 | PET-PE | 482, AS | 714, AS | 918, FT | 982, FT |
| Example 3 | PET-PE | 187, AF | 366, AS | 699, AS | 1029, FT |
| Example 4 | PET-PE | 174, AF | 418, AS | 1042, FT | 1169, FT |
| Example 5 | PET-PE | 381, AS | 700, AS | 1159, FT | 1028, FS |

TABLE 6

Bond strength of laminating adhesives based on
Comparative Example 2, Example 4 and 5 for various structures

| Laminate adhesive | Laminate structure | Initial bond strength (g/inch) | 1 day bond strength (g/inch) | 7 days bond strength (g/inch) | 50° C. 1 day bond strength (g/inch) |
|---|---|---|---|---|---|
| Comparative Example 2 | PET/PE | 482, AS | 714, AS | 918, FT | 976, FT |
| | OPP/PE | 375, FT | 839, FT | 1100, FT | 1180, FT |
| | PET-Foil/PE | 358, AS | 398, AS | 507, AS | 427, AS |
| Example 4 | PET/PE | 174, AF | 418, AS | 1042, FT | 1170, FT |
| | OPP/PE | 131, AF | 261, FT | 622, FT | 1115, FT |
| | PET-Foil/PE | 190, AF | 326, AF | 596, AS | 723, FT |
| Example 5 | PET/PE | 381, AS | 700, AS | 1159, FT | 1314, FT |
| | OPP/PE | 341, AS | 527, FT | 640, FT | 1123, FT |
| | PET-Foil/PE | 321, AS | 358, AS | 521, AS | 491, AS |

Comparative Example 2, Example 6 and 7

Laminating adhesive Comparative Example 2, and Examples 6 and 7 were evaluated in PET/PE laminates. Anquamine 401 was used as a curing agent for Examples 6 and 7. The stoichiometry of epoxide/NH groups was set at 1/1. Typical bond strength results are summarized in Table 7. Compared with Comparative Example 2, Examples 6 and 7 showed better bond strength than that of Comparative Example 2 after fully cured. Film tear was observed in all cases.

Heat and chemical resistance of laminates was studied through boil in bag test with either DI water or 1/1/1 sauce filled into the pouches prepared with the cured laminates. Examples 6 and 7 showed better heat and chemical resistance than Comparative Example 2. Higher bond strength was observed after the boil in bag test at 100° C. for 30 minute with exposure to 1/1/1 sauce.

The invention claimed is:

1. A laminating adhesive composition, consisting of:
   a) an aqueous dispersion of thermoplastic polymer particles imbibed with an epoxy compound, wherein the epoxy compound is an aliphatic epoxy resin or a cyclo-aliphatic epoxy resin and wherein the concentration of the epoxy compound is from 1 to 40 weight percent, based on the total weight of the solid content of the aqueous dispersion; and
   b) at least one water emulsifiable or water dispersible epoxy curing agent selected from polyamines, polyamides, amidoamines, carboxylic functional polyesters, anhydrides, mercaptans, polymercaptans, cyclic amidines, and combinations thereof.

2. The composition of claim 1, wherein the epoxy compound is selected from the group consisting of 1,2-propanediol diglycidyl ether, 1,4-butanediol diglycidyl ether, 1,6-hexanediol diglycidyl ether, poly(propylene glycol)

TABLE 7

Bond strength of laminating adhesives based on Comparative
Example 2, Example 6 and 7 for PET/PE Structure

| Laminate adhesive | Laminate structure | Initial bond strength (g/inch) | 1 day bond strength (g/inch) | 7 days bond strength (g/inch) | 50° C. 1 day bond strength (g/inch) | After water boiling bond strength (g/inch) | After 1/1/1 sauce boiling bond strength (g/inch) |
|---|---|---|---|---|---|---|---|
| Comparative Example 2 | PET-PE | 482, AS | 714, AS | 918, FT | 976, FT | 695, FT | 101, AS |
| Example 6 | PET-PE | 394, AS | 588, AS | 1105, AS | 1243, FT | 786, FT | 150, AS |
| Example 7 | PET-PE | 382, AS | 1160, FT | 1297, FT | 1289, FT | 504, FT | 268, AS | diglycidyl ether, 1,4-cyclohexanedmethanol diglycidyl ether, 1,3-cyclohexanedmethanol diglycidyl ether, 3',4'-epoxycyclohexymethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, vinyl cyclohexene monoxide, bis(3,4-epoxycyclohexylmethyl) adipate, and mixtures thereof.

3. A method for forming a cured laminate, comprising:
 a) applying the curable composition of claim 1 to a first substrate;
 b) drying the curable composition;
 c) laminating a second substrate to the coated first substrate to form a laminate; and
 d) curing the laminate to form the cured laminate.

4. The method of claim 3, wherein the first and/or second substrate is selected from the group consisting of a polymer film, a metalized polymer film, a foil, a polymer-backed metal foil, paper, and combinations thereof.

* * * * *